(12) United States Patent
Zelson

(10) Patent No.: US 7,287,545 B2
(45) Date of Patent: Oct. 30, 2007

(54) SANITARY CHECK VALVE

(76) Inventor: Larry Saul Zelson, 554 William Penn Way, Lansdale, PA (US) 19446-4174

( * ) Notice: Subject to any disclaimer, the term of this patent is extended or adjusted under 35 U.S.C. 154(b) by 247 days.

(21) Appl. No.: 10/860,252

(22) Filed: Jun. 3, 2004

(65) Prior Publication Data
US 2004/0250864 A1 Dec. 16, 2004

Related U.S. Application Data

(60) Provisional application No. 60/477,193, filed on Jun. 10, 2003.

(51) Int. Cl.
*F16K 15/02* (2006.01)
(52) U.S. Cl. .................... 137/515.7; 137/859
(58) Field of Classification Search ............ 137/515.7, 137/859, 843
See application file for complete search history.

(56) References Cited

U.S. PATENT DOCUMENTS

| | | | |
|---|---|---|---|
| 2,170,478 A | | 8/1939 | Long et al. |
| 3,270,771 A | * | 9/1966 | Morgan et al. ............ 137/859 |
| 3,465,786 A | * | 9/1969 | Spisak .................... 137/516.27 |
| 3,646,956 A | * | 3/1972 | Rogers ...................... 137/859 |
| 3,827,456 A | * | 8/1974 | Sheppard ................... 137/859 |
| 4,148,338 A | | 4/1979 | Skoli |
| 4,182,355 A | * | 1/1980 | Briel et al. ................. 137/496 |
| 4,712,583 A | * | 12/1987 | Pelmulder et al. .......... 137/852 |
| 4,762,309 A | * | 8/1988 | Hutchins ............... 267/140.13 |
| 5,033,503 A | | 7/1991 | Horton et al. |
| 5,103,854 A | * | 4/1992 | Bailey et al. ............... 137/102 |
| 5,121,840 A | * | 6/1992 | Schram ...................... 206/522 |
| 5,509,444 A | * | 4/1996 | Robinson et al. ........... 137/508 |
| 5,617,897 A | * | 4/1997 | Myers ........................ 137/859 |
| 5,664,602 A | * | 9/1997 | Madrid .................... 137/515.7 |
| 6,039,073 A | * | 3/2000 | Messick et al. .......... 137/515.7 |
| 6,152,171 A | | 11/2000 | Messick et al. |
| 6,662,827 B1 | * | 12/2003 | Clougherty et al. ........ 137/859 |
| 6,968,976 B2 | * | 11/2005 | Masuda ....................... 222/92 |

OTHER PUBLICATIONS

Check-All Valve Manufacturing, Style SCV Sanitary Cartridge Valve, Sep. 2002.
Check-All Valve Manufacturing, Style 3SC Sanitary Check Valve, Sep. 2002.
Check-All Valve Manufacturing, Style SIV Sanitary Insert Valve, Sep. 2002.

(Continued)

*Primary Examiner*—Gregory Huson
*Assistant Examiner*—Cloud Lee
(74) *Attorney, Agent, or Firm*—Larry S. Zelson

(57) ABSTRACT

A check valve adapted for mounting between any flanges and specifically between sanitary flanges in a piping system, the check valve comprising a stationary portion and a flexible portion; the single-piece rigid stationary portion including and supporting a valve seat; the single-piece molded elastomeric flexible portion including a flange gasket, a valve plug, flexible retaining arms for guiding and securing the valve plug movement with respect to the valve seat, and a visual means to indicate that the check valve is installed, permits flow in the desired direction, and is drainable; the check valve being fully cleanable and sterilizable in situ by flow-through methods and having at least one embodiment that is fully drainable when mounted in any orientation.

17 Claims, 11 Drawing Sheets

OTHER PUBLICATIONS

Waukesha Cherry-Burrell, W45 Check Valve, Apr. 1997.
Lumaco, Concentric Check Valve, undated, printed from web site Oct. 18, 2002.
DFR Incorporated, DSV Sanitary Check Valve, undated, printed from web site approximately Oct. 2002.

* cited by examiner

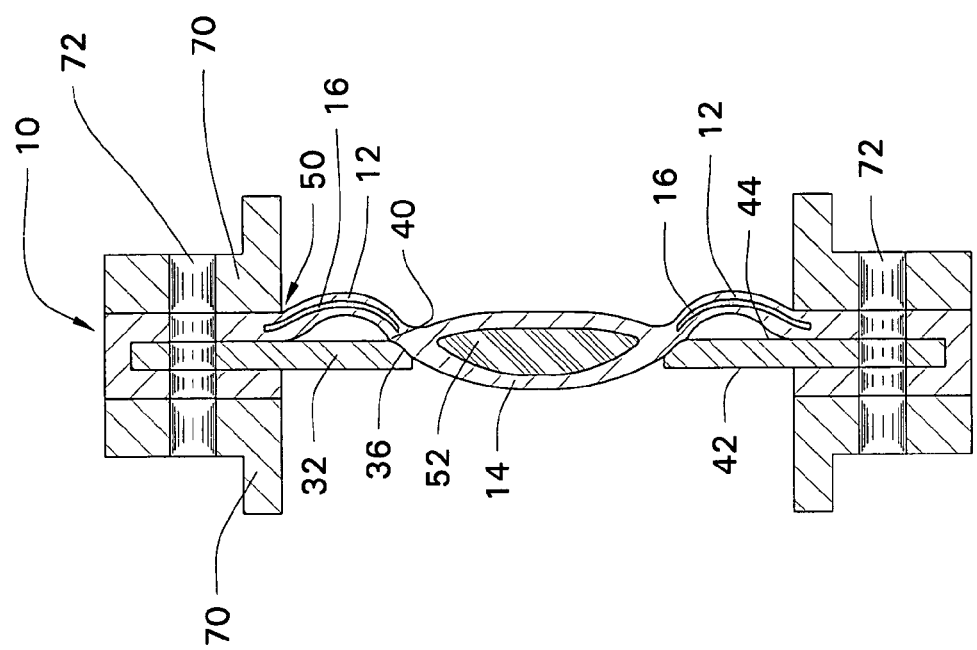
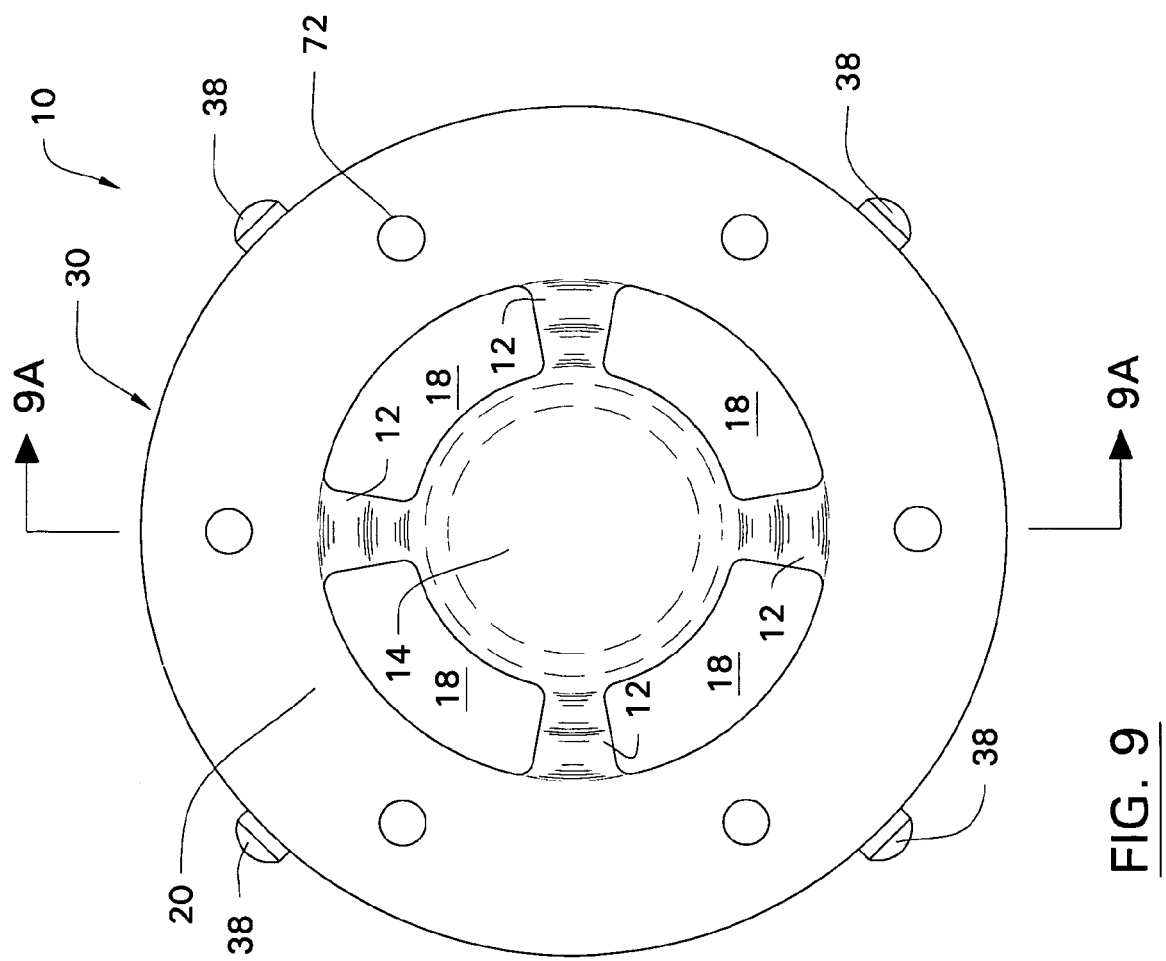
FIG. 9A
FIG. 9

SANITARY CHECK VALVE

CROSS-REFERENCE TO RELATED APPLICATIONS

This application claims the benefit of the filing date of provisional application No. 60/477,193 which was filed on Jun. 10, 2003.

BACKGROUND OF THE INVENTION

The present invention relates to valves used to restrict the direction of flow in process piping. More specifically, the present invention relates to a check valve which can be inserted between two standard flanges in any process piping system. Yet more specifically, the present invention relates to a simple, low cost, easily installed, replaceable check valve particularly adapted for sanitary piping systems used in the food, dairy, pharmaceutical, and biotechnology industries.

The use of check valves in sanitary piping systems is well known in the prior art. Although prior devices have been designed to accomplish the purpose of maintaining unidirectional flow while meeting the constraints of sanitary piping practice, each possesses disadvantages which are overcome in the present invention. In fact, many utilize a similar design and manner of operation which is significantly different from the design and manner of operation of the present invention.

There are several important criteria for selecting a check valve for use in a sanitary piping system. Perhaps the most important is that the valve be drainable, such that the valve does not include any physical features which would retain permanent puddles of water or liquid. While it is sometimes inevitable that a puddle of liquid may be formed when a valve is in the closed position, due to the orientation and flow direction of the piping into which the valve is mounted, it is critical that this puddle disappear when the valve is opened during the sterilization operation. Full drainability is a cardinal rule in the design of sanitary piping systems.

In a typical sterilization operation, steam is flowed through the sanitary piping system, raising all internal surfaces to a temperature of at least 250° F. (121° C.) and a corresponding saturation pressure of approximately 15.2 PSIG, and holding them at this temperature and pressure for a minimum of 30 minutes. Of course, other time-temperature profiles are used in different circumstances, but this is one of the most common. If a puddle of liquid were to be retained anywhere within the piping system, this puddle may not attain a sufficient time-temperature profile during sterilization to kill any potential contaminating organisms, and as a result the system may not be sterile. Lack of sterility can cause the loss of a entire batches of product and large amounts of wasted production time and money.

Implicit in the drainability criteria is also the requirement that the valve be capable of operating through repeated cycles of production and steam sterilization. It is noted that often a single sequence of the cycle involves multiple steps, for example steam sterilization to production to cleaning to steam sterilization. Once a system has been sterilized, no pipe fittings can be disconnected to replace a component without compromising the sterility of the entire system. Further, if a system is contaminated during production, no pipe fittings can be disconnected to replace a component until another sterilization has been completed without jeopardizing the safety of personnel.

An additional criteria for selecting a check valve for sanitary piping systems is that the valve be easily installed, maintained, and if necessary, replaced. A bonus feature would be the ability to readily retrofit the valve into existing sanitary piping systems. Because sterility is such a premium requirement, it is routine for all of the elastomer components of a sanitary system to be replace on a regular preventive maintenance schedule. Thus, a valve which is not easily accessible for maintenance or replacement would be a liability.

A further criteria for selecting a check valve for a sanitary piping system, or for any piping system, is noiseless operation. Often, when there is barely sufficient forward flow to overcome the cracking pressure of a check valve, the valve will flutter rapidly between its closed and open states, as pressure accumulates and is then relieved upstream of the valve. When both the stationary valve seat and the moving valve plug are made of metal or another hard material, this rapid flutter will inevitably result in chattering, creating an annoying noise for nearby workers and possibly doing harm to the components of the valve.

Yet a further criteria for selecting a check valve for a sanitary piping system, or for any piping system, is that the valve provides a simple visual indicator or means to ascertain that the valve is in fact installed, that the valve is installed in the correct flow direction, and that the valve is installed so that it is fully drainable. Some of the sanitary check valves currently on the market may be installed in between sanitary flanges but once they are installed there is no visual or other indication, other than breaking the flange connection and pulling the pipes apart, to know that the valve is present or that it is facing in the correct flow direction.

The check valve of U.S. Pat. No. 2,170,478 [Long], while not designed for sanitary applications, discloses a basic physical design that is common in the prior art. This valve includes a spring loaded valve plug which moves longitudinally inside a pipe with respect to a stationary valve seat in combination with a stationary flow-through mounting arrangement which anchors the spring.

The check valve of U.S. Pat. No. 4,138,338 [Skoli] discloses a similar physical design whereby the combined stationary valve seat and flow-through mounting yoke is designed to be held in place between two flanges in a piping system. Although the mounting system is of a more sanitary design, this check valve includes a spring and a threaded nut and bolt arrangement which have crevices for contamination to collect. This valve, however, does provide a visual indicator of flow direction.

U.S. Pat. No. 5,033,503 [Horton] discloses a check valve which is commercially available as the "Style SCV Sanitary Cartridge Valve" from Check-All Valve Manufacturing Co. This valve is retained between two mating pipe flanges by an annular shoulder on the valve seat holder and features a spring loaded plug which moves longitudinally with respect to the valve body to open and close a flow passage. The design includes o-rings intended to seal between the valve seat holder and the inside wall of the piping, to prevent fluid from leaking out between the flanges and to eliminate the need for a flange gasket. This creates two problems. First, there is an annular crevice between the valve seat holder and the inside pipe wall, extending inwardly from each end of the valve back to the corresponding o-ring, which is not readily cleanable and sterilizable. Second, in practice, these o-rings do not seal well, since the internal surface of the pipe or tube is not design for this type of application and is therefore not of sufficient uniformity. The resultant leakage past the o-rings creates either a leak out of the flange or necessitates the addition of a flange gasket. Further, any process fluid leaking behind the o-rings presents a much more serious risk of contamination due to the complete inability to clean and sterilize this area bounded by the pipe wall, the valve body, the o-rings, and the flange gasket. Additionally, this valve provides no visual indicator of flow direction or that it is in fact installed at all, and in practice it is sometimes required to pull apart the mating pipe ends just to verify the existence and proper installation of the valve.

U.S. Pat. No. 6,039,073 [Messick] and U.S. Pat. No. 6,152,171 [Messick] disclose a valve commercially available as the "Style 3SC Sanitary Check Valve" from Check-All Manufacturing Co. This valve includes a different plunger from the "Style SCV" valve and is specifically intended for installation between sanitary style flanges of the tri-clamp design. However, the "Style 3SC" valve includes the same o-ring configuration as the "Style SCV" valve and therefore suffers from the same disadvantages and problems. This valve, too, lacks any visual means to indicate that it is installed at all, or that it is installed in the correct flow direction.

Check-All Manufacturing Co. also markets another check valve for mounting between sanitary flanges as the "Style SIV Sanitary Insert Valve". This check valve includes a similar plunger to the other Check-All valves. The mounting arrangement of this valve includes an annular shoulder molded into the valve seat holder which also acts as the tri-clamp flange gasket, eliminating the need for o-rings. However, this valve also includes a shroud around the valve plug having an outside diameter almost as large as the inside diameter of the pipe or tube into which it fits, thus creating a potential crevice with its inherent cleaning and sterilization problems. Also, this valve lacks any visual means to indicate that it is installed at all, or that it is installed in the correct flow direction.

Other commercial check valves are on the market. The "W45" check valve from Waukesha Cherry-Burrell is designed for sanitary service and includes a valve body which inserts in-line between two sanitary flanges as a section of tubing with varying diameter. The valve body has sanitary flanges at either end and a third sanitary flange pair in the center to retain a stationary valve guide. A spring-loaded valve plug moves longitudinally with respect to the valve guide and seats on a tapered portion of the inside wall of the valve body. To create a flow passage when the valve plug is in the open position, the valve body includes a section of larger diameter than the prevailing tubing in which it is mounted, thus creating a potential low point if this valve were to be mounted in horizontal piping. Therefore, this valve design must be mounted in vertically piping in order to be fully drainable for sanitary purpose, in accordance with the mounting instructions of the manufacturer. Lumaco markets a sanitary check valve that is almost identical in design to the "W45" of Waukesha Cherry-Burrell.

The "DSV Sanitary Check Valve" by DFT Incorporated is sold in both a vertical and a horizontal mounting configuration. This valve includes a valve body which inserts in-line between two sanitary flanges as a section of tubing with varying diameter which retains one end of a flow-through mounting yoke and valve guide. The valve body has sanitary flanges at either end and a third sanitary flange pair in the center to retain the other end of the mounting yoke and to create a valve seat. A spring-loaded valve plug moves longitudinally with respect to the valve guide and mounting yoke. To create a flow passage when the valve plug is in the open position, the valve body includes a section of larger diameter than the prevailing tubing in which it is mounted. In order to make the horizontal mounting design drainable, the outlet portion of the valve is offset in a downward direction from the inlet portion of the valve so that the outlet section is the low point. Therefore, for drainability, this valve can only be mounted in downward-pitched horizontal piping and not in upward-pitched horizontal piping.

Accordingly, it is an object of the present invention to provide a sanitary check valve adapted for mounting between any flanges, and particularly between sanitary flanges, in an existing piping or tubing system. It is another object of the present invention to provide a sanitary check valve that is fully drainable when mounted in piping pitched at any orientation, including vertical, near horizontal, or any angle in between. It is a further object of the present invention to provide a sanitary check valve that contains no crevices or physical features which may capture contaminants, so that the valve is cleanable by conventional flow-through CIP (clean-in-place) methods and sterilizable by conventional flow-through steam SIP (sterilize-in-place) methods. It is still a further object of the present invention to provide a sanitary check valve which includes a simple visual indicator that the valve is in fact installed, that the valve is installed in the correct flow direction, and that the valve is installed so that it is fully drainable.

It is yet another object of the present invention to provide a sanitary check valve that is durable and inexpensive compared with those presently on the market. It is yet a further object of the present invention to provide a sanitary check valve that is easily replaceable during routine preventive maintenance. It is still a further object of the present invention to provide a sanitary check valve that may be fabricated from materials already widely accepted and used in the food, dairy, pharmaceutical, and biotechnology industries.

Other objects will appear hereinafter.

SUMMARY OF THE INVENTION

The present invention overcomes the foregoing disadvantages inherent in the known types of sanitary check valves in the prior art. The sanitary check valve of the present invention is of a simple design yet incorporates several features which render it preferable for sanitary and non-sanitary applications alike.

The sanitary check valve of the present invention comprises two components: a stationary portion, termed the valve seat plate, having sufficient rigidity to resist the force of forward flow and back pressure, and a flexible portion, termed the molded elastomer valve body, serving as a combination flange gasket, valve plug, valve sealing spring system, and visual orientation indicator. As assembled, the valve is not much thicker than a standard flange gasket and is therefore readily designed into new piping systems, retrofitted into existing piping systems, and removed and re-installed for replacement during routine preventative maintenance or in the event of material failure.

Because the functional novelty of the valve is independent of the flange gasket portion of the valve design, the valve can be used in virtually any piping systems wherein pipes are joined by flanges. Additionally, because the valve is inexpensive to manufacture and is durable and easily maintained, it may be the most cost effective alternative in a wide variety of piping systems. Also, the valve includes a simple visual means to indicated that the valve is in fact installed, that the valve is installed in the correct flow direction, and that the valve is installed so that it is fully drainable.

Nevertheless, many of the features of the valve are specifically advantageous when the valve is installed in sanitary piping systems. The valve does not include any crevices or physical features which could capture or retain contaminants and compromise the sterility of a piping system, so that the valve is cleanable by conventional flow-through CIP methods and is sterilizable by conventional flow-through steam SIP methods. Further, there is at least one embodiment of the valve which is fully drainable for any given valve mounting orientation, and there is one particular embodiment which is fully drainable in every possible valve mounting orientation (except for perfectly horizontal, in which case even the straight piping is not technically free draining). Further still, the valve may be manufactured from materials already widely accepted and used in the food, dairy, pharmaceutical, and biotechnology industries, materials which have the proven ability to be repeated cleaned and sterilized per industry standards.

The molded elastomer valve body of the sanitary check valve of the present invention is formed from a flexible and resilient elastomer into a single piece with four functional sections: a flange gasket, a valve plug, a plurality of flexible retaining arms, and one or more orientation tabs. The flange gasket, located at the perimeter of the valve body, includes an internal groove to receive the valve seat plate, as well as external faces adapted to mate with the pipe flanges into which it is mounted, as may be required for certain types of sanitary pipe flanges.

The valve seat plate of the sanitary check valve of the present invention is a rigid plate with a beveled central hole functioning as valve port and seat. Both faces of the plate are tapered towards the valve port, so that liquid will freely drain from the faces in virtually any mounting orientation. The plate is adapted to fit snugly into a mating groove in the flange gasket of the molded valve body of the valve so that a tight seal is formed when the valve is installed between two pipe flanges. The plate may be formed from any metal or plastic or sufficiently rigid material.

The valve plug, at the center of the valve body, aligns with the valve port of the valve seat plate and is shaped to seal the valve port tightly and repeatable by interfacing against the valve seat. The valve plug optionally includes a core for greater rigidity, as may be required depending on the material of construction and diameter of the valve plug.

The flexible retaining arms, interconnecting between the flange gasket and the valve plug, enable the valve plug to move away from and inwardly towards the valve port and seat, so that fluid flow may be permitted in the forward direction but prevented in the backward direction. The retaining arms possess sufficient flexibility, resilience, and spring strength to both provide a cracking pressure resistance to flow and to tightly hold the valve plug against the valve seat, in the absence or presence of back pressure. The retaining arms optionally include a spring means for greater spring strength, as may be required or desired to adjust the cracking pressure of the valve and to ensure adequate sealing of the valve plug against the valve seat, depending on the material of construction and diameter of the valve plug, the number of retaining arms, and the specific engineering application.

One or more orientation tabs are integrally attached to the outer perimeter of the flange gasket, extending outwardly so that they can be seen between the pipe flanges. In addition to extending outwardly, the orientation tabs extend forwardly in the same downstream direction as the valve plug moves with respect to the valve seat, thus indicating flow direction. Further, the orientation tabs are positioned corresponding to the open flow paths interposed between the flexible arms, so that by mounting the valve with an orientation tab facing vertically, either upward (for embodiments with an even number of flexible arms) or downward (for embodiments with any number of flexible arms), the valve can be known to be fully drainable.

Multiple embodiments of the sanitary check valve of the present invention are disclosed and illustrated herein, in order to show the breadth of the valve and the range of piping applications for which the valve may be appropriate. The most basic embodiment of the present invention includes four flexible arms and a valve port and plug smaller than the prevailing inside pipe diameter into which it is installed, and is particularly well suited for mounting in vertical sanitary piping arrangements, with flow going upward or downward. A slightly modified embodiment is shown having three flexible arms, but could just as easily have five or six or more flexible arms.

Four alternate embodiments are disclosed which comprise an integrated upstream flange and valve seat plate. Two of these alternate embodiments provide a valve port that is smaller than the prevailing inside pipe diameter into which they are installed, while the other two alternate embodiments provide a valve port that is the same size as the prevailing inside pipe diameter into which they are installed and are thus termed "full flow designs". One of these full flow designs is optimized for mounting in downward sloping horizontal piping while the other is optimized for mounting in vertical piping, upward or downward flowing.

An additional alternate embodiment includes an ovalized valve port, seat, and plug, and is uniquely capable of being fully drainable when mounted in piping of any orientation. Finally, a further alternate embodiment is disclosed with a generic flat faced flange instead of a typical sanitary piping flange, to exemplify that changing the flange type has no impact on the viability of the check valve design of the present invention.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 9 is an end elevation view of an alternate version of the sanitary check valve of the present invention for mounting between standard flat face flanges, viewed from the downstream direction looking upstream.

FIG. 9A is a cross sectional view of the alternate flat flange mounted version of the sanitary check valve of the present invention in the closed position installed in between standard pipe flanges, taken through the 9A-9A section of FIG. 9.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
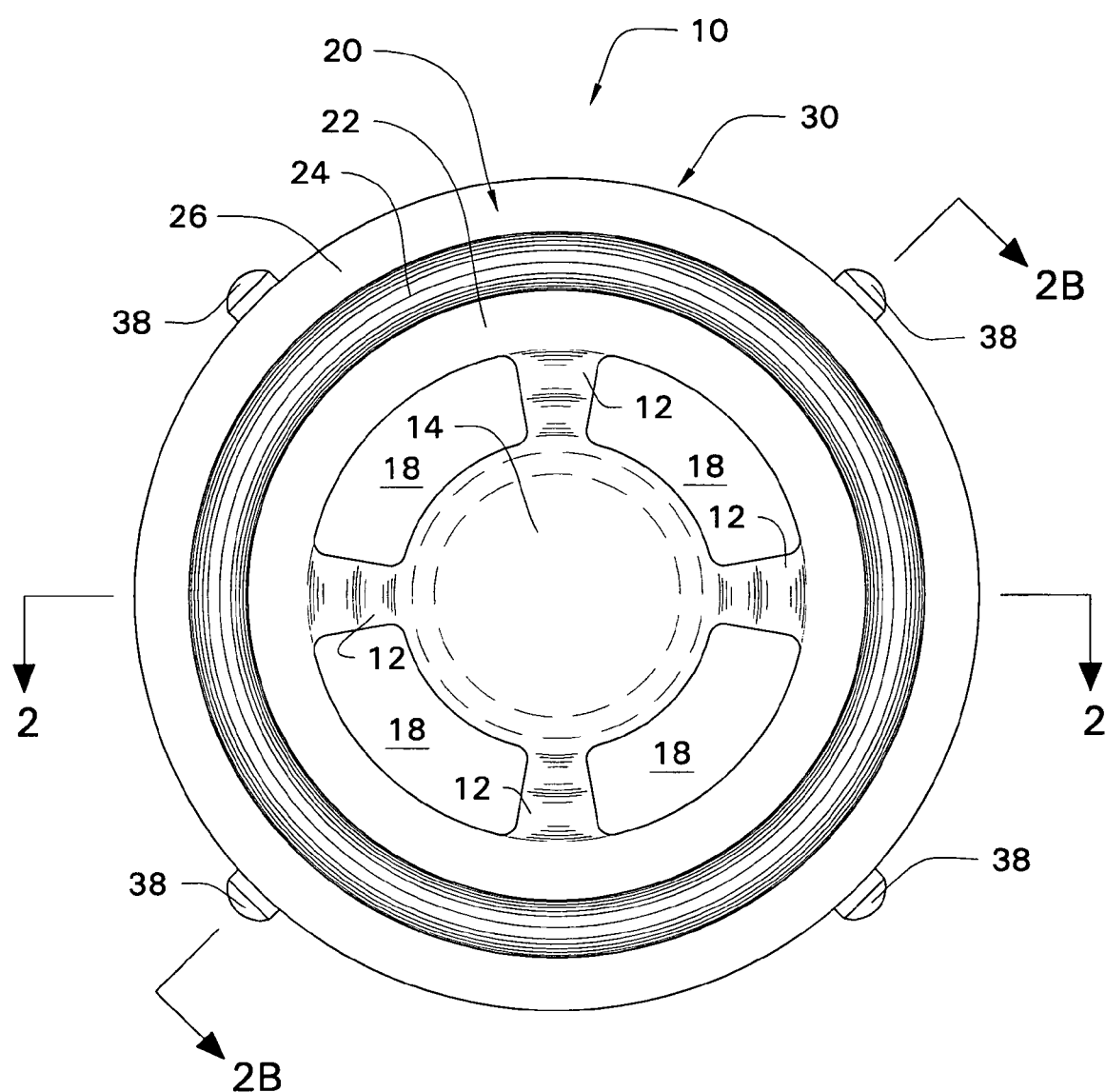
FIG. 1 is an end elevation view of the sanitary check valve of the present invention viewed from the downstream direction looking upstream.
Figure 3:
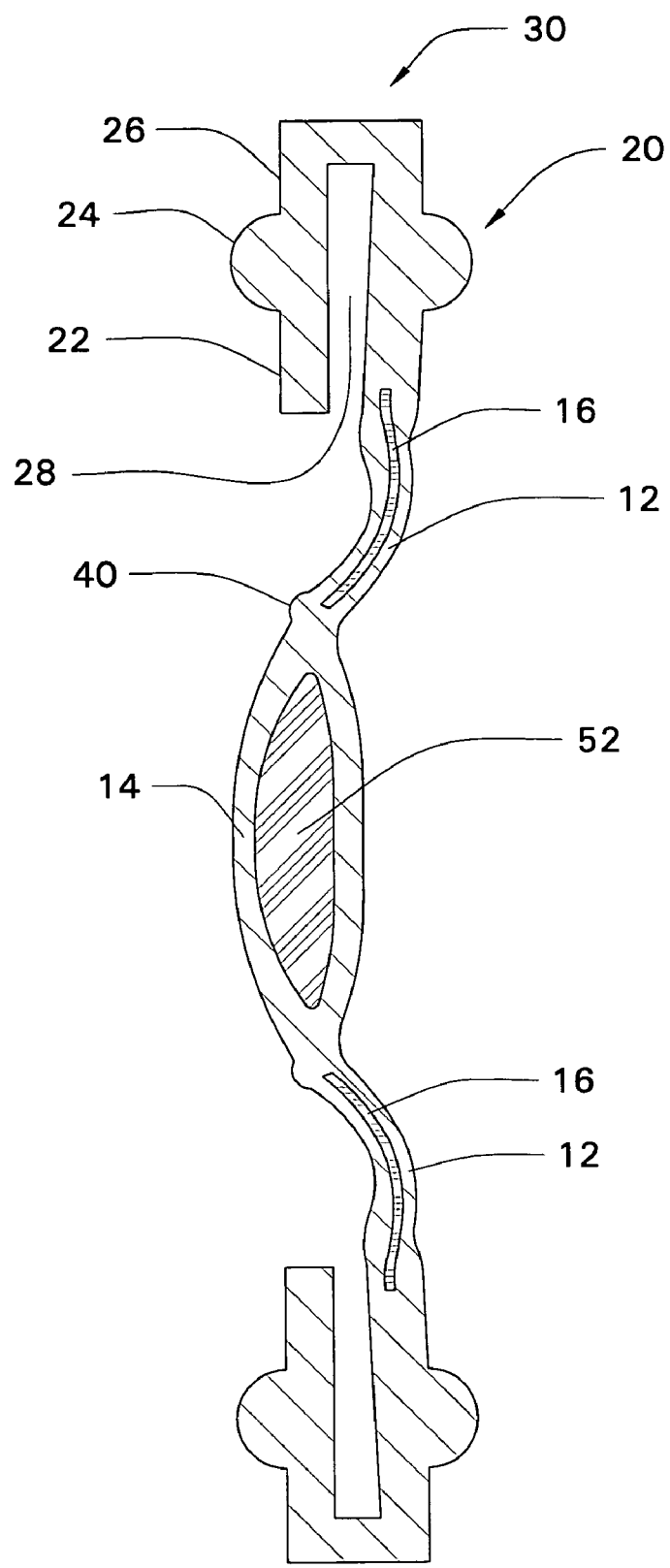
FIG. 3 is an enlarged cross sectional view of the molded elastomer valve portion of the sanitary check valve of the present invention shown as molded, without the valve seat plate installed, taken through the 2-2 section of FIG. 1.
Figure 4:
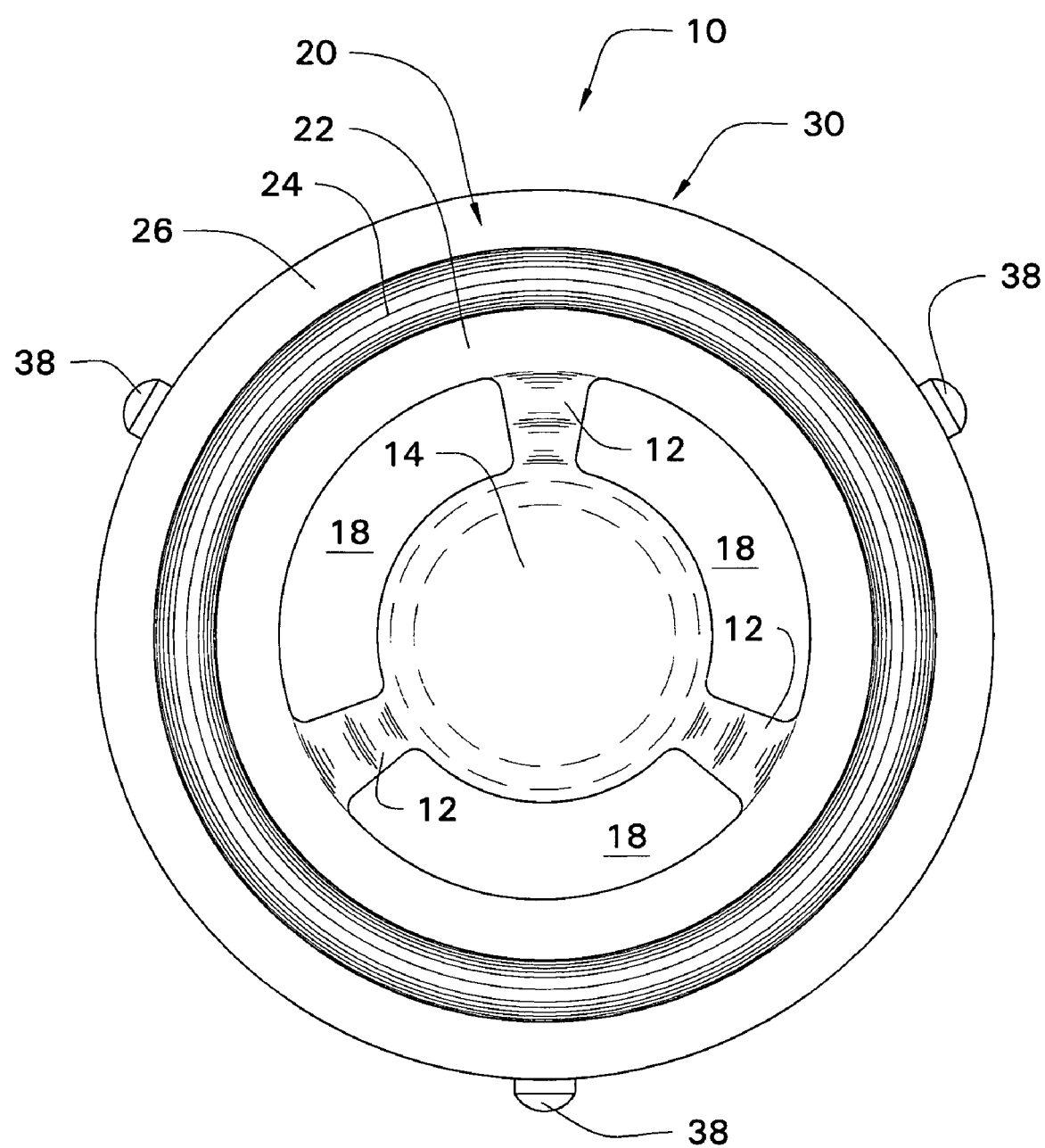
FIG. 4 is an end elevation view of an alternate three-armed embodiment of the sanitary check valve of the present invention viewed from the downstream direction looking upstream.
Figure 5:
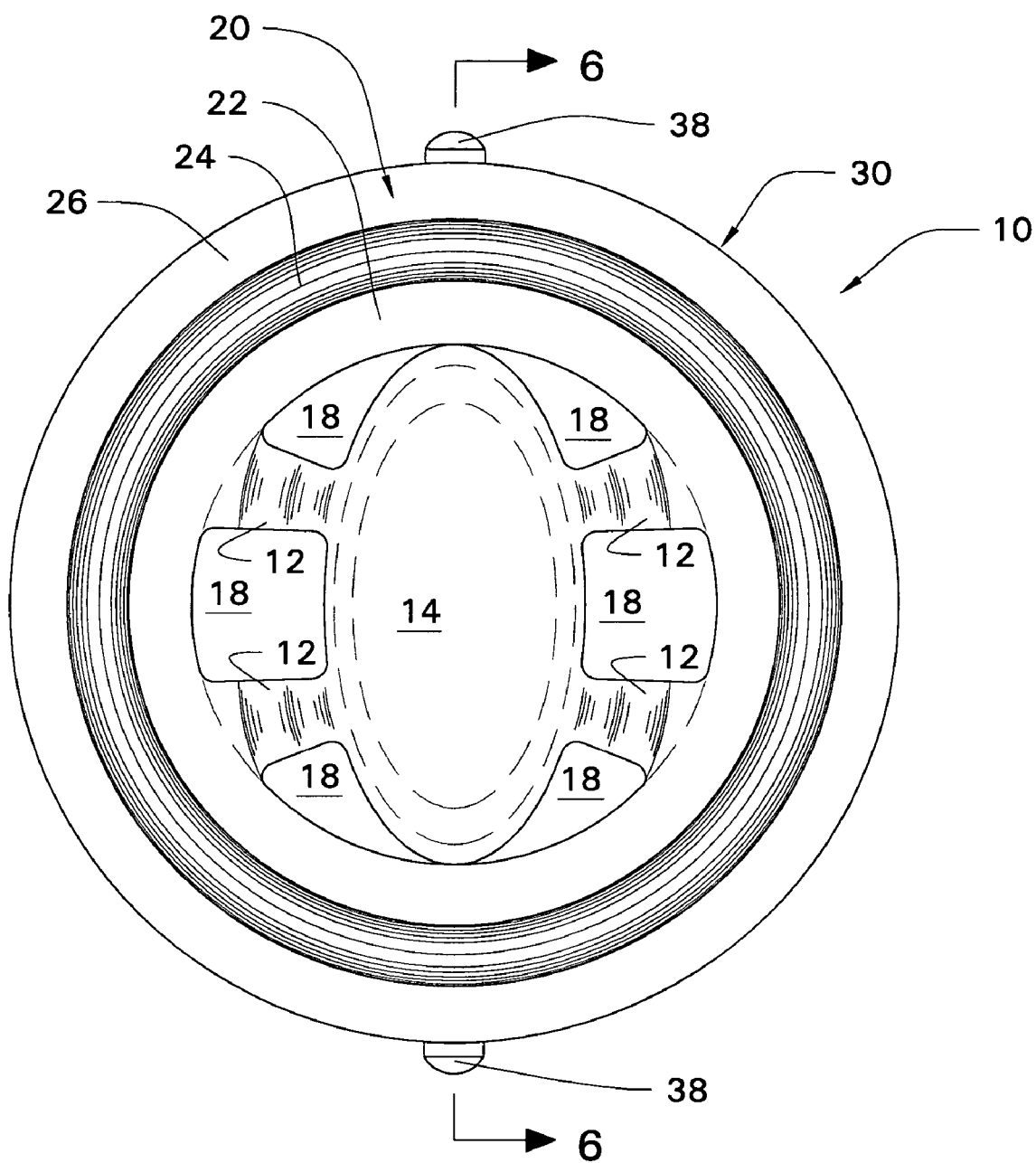
FIG. 5 is an end elevation view of an alternate horizontally drainable embodiment of the sanitary check valve of the present invention viewed from the downstream direction looking upstream.
Figure 6A:
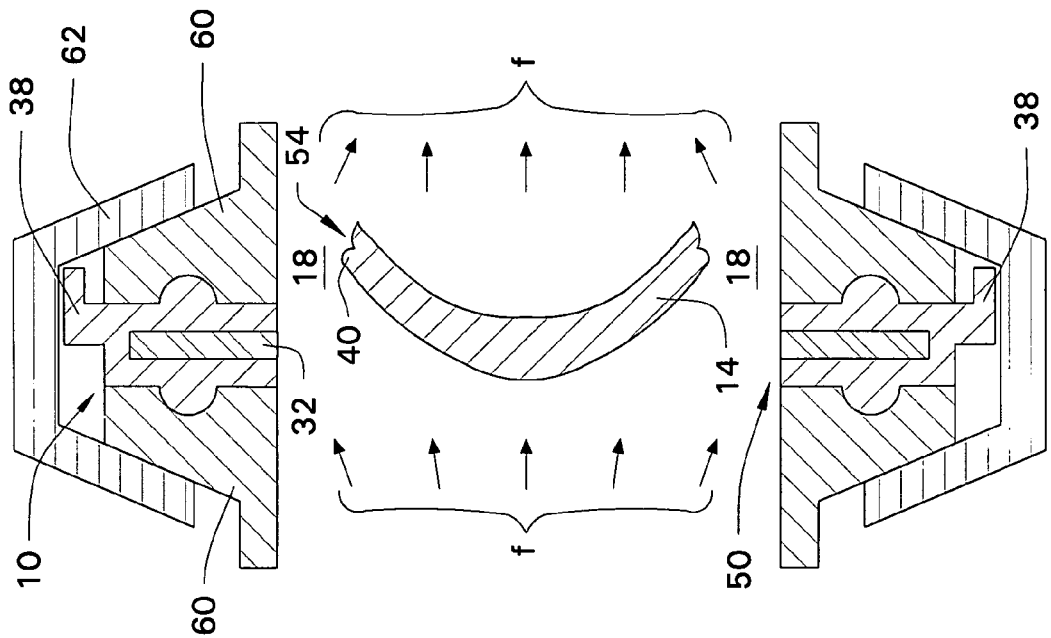
FIG. 6A is a cross sectional view of the alternate horizontally drainable embodiment of the sanitary check valve of the present invention in the open position installed between sanitary pipe flanges, taken through the 6-6 section of FIG. 5, showing fluid flow in the forward direction.
Figure 6:
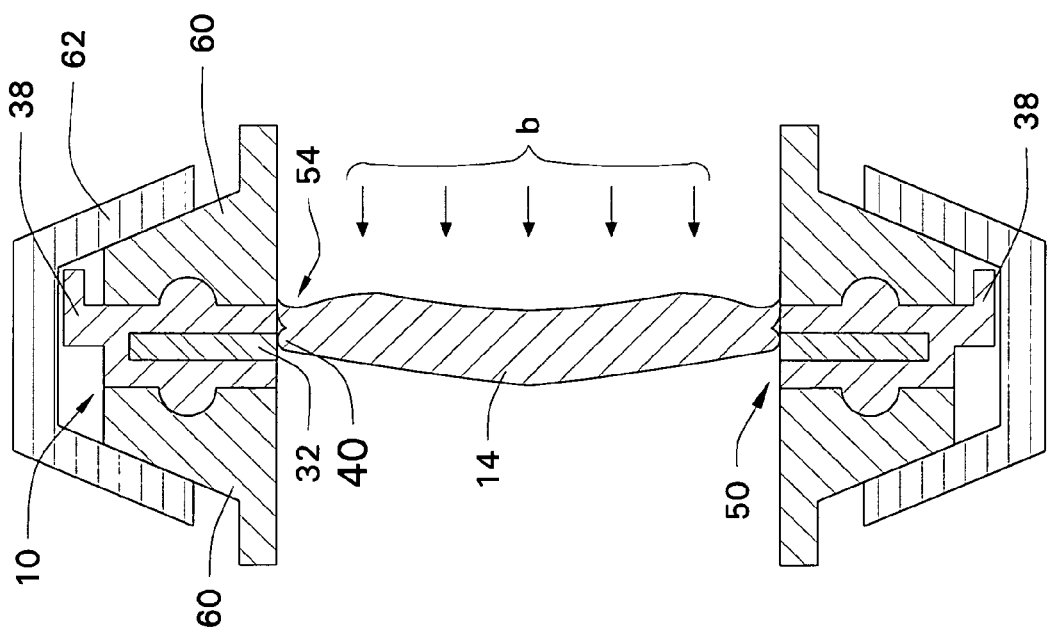
FIG. 6 is a cross sectional view of the alternate horizontally drainable embodiment of the sanitary check valve of the present invention in the closed position installed in between sanitary pipe flanges, taken through the 6-6 section of FIG. 5, showing the acting force of back pressure.
Figure 8:
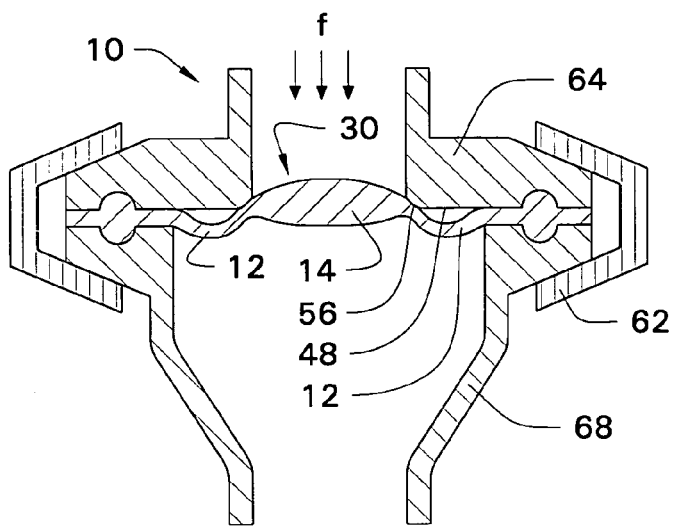
FIG. 8 is a cross sectional view of the concentric full flow vertical version of the sanitary check valve of the present invention in the closed position mounted with a downward flow direction, taken through an equivalent of the 2-2 section of FIG. 1.
Figure 8A:
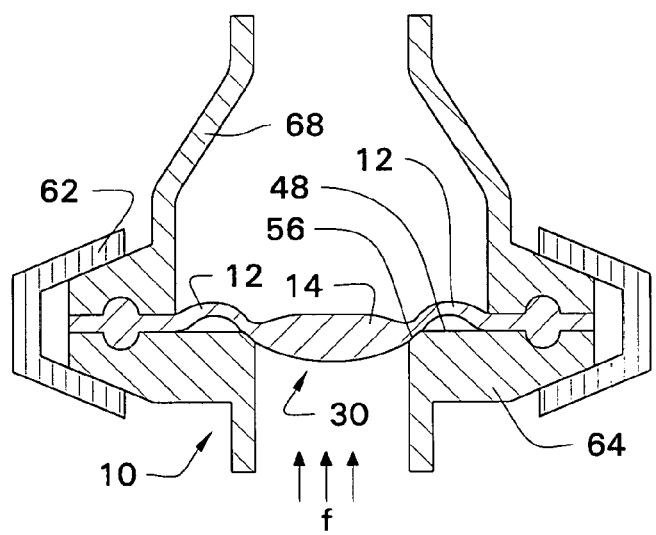
FIG. 8A is a cross sectional view of the concentric full flow vertical version of the sanitary check valve of the present invention in the closed position mounted with an upward flow direction, taken through an equivalent of the 2-2 section of FIG. 1.
Figure 7:
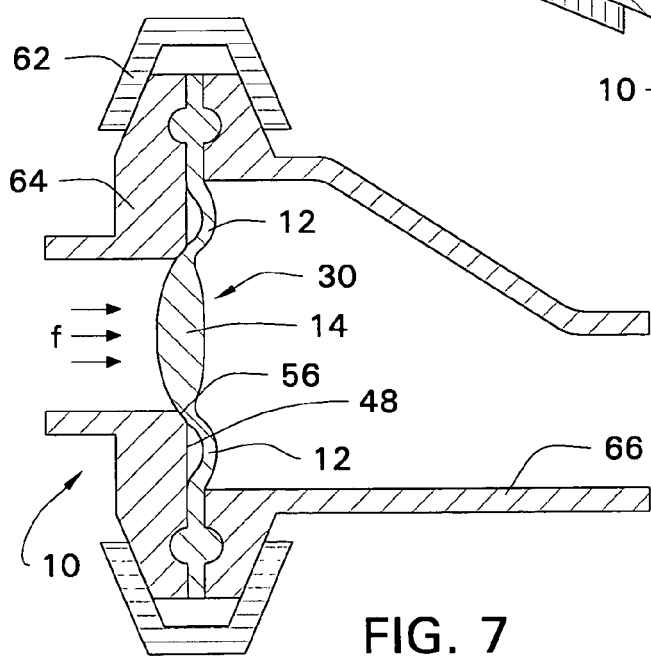
FIG. 7 is a cross sectional view of the eccentric full flow horizontal version of the sanitary check valve of the present invention in the closed position, taken through an equivalent of the 2-2 section of FIG. 1.
Figure 11:
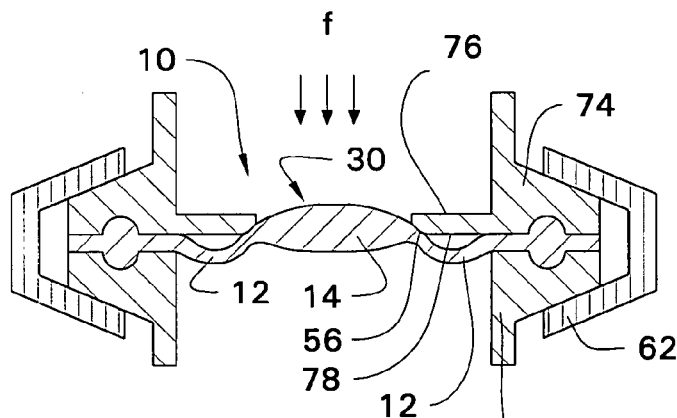
FIG. 11 is a cross sectional view of the alternate flanged seat plate version of the sanitary check valve of the present invention in the closed position mounted with a downward flow direction, taken through an equivalent of the 2-2 section of FIG. 1.
Figure 11A:
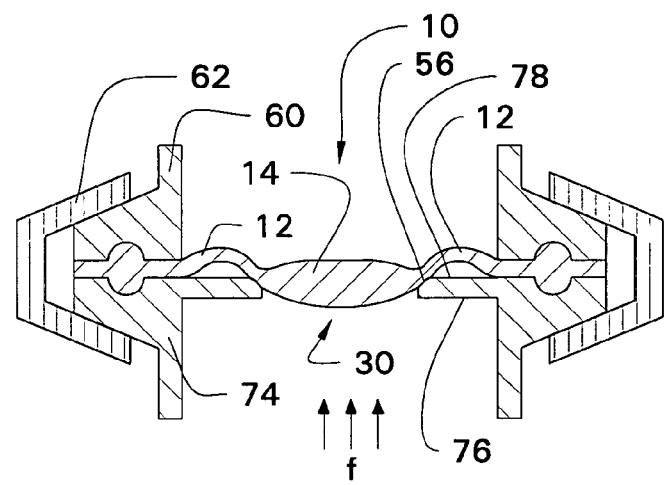
FIG. 11A is a cross sectional view of the alternate flanged seat plate version of the sanitary check valve of the present invention in the closed position mounted with an upward flow direction, taken through an equivalent of the 2-2 section of FIG. 1.
Figure 10:
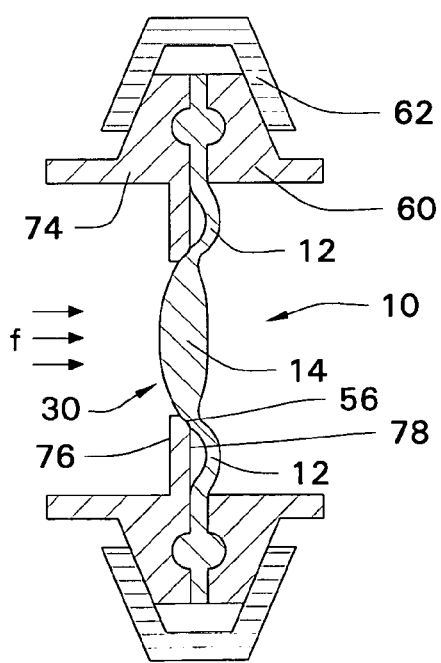
FIG. 10 is a cross sectional view of the alternate flanged seat plate version of the sanitary check valve of the present invention in the closed position with horizontal flow, taken through an equivalent of the 2-2 section of FIG. 1.

Referring now to the drawings in detail, where like numerals refer to like parts or elements, there are illustrated seven different embodiments of the sanitary check valve device 10 of the present invention. The most basic embodiment, having a circular concentric valve plug 14 supported by four flexible retaining arms 12 and a fully drainable geometry when mounted in vertical piping, is shown in FIGS. 1 through 3. An alternate embodiment having the same valve plug 14 but having only three retaining arms 12 is shown in FIG. 4. Another alternate embodiment having an elliptical valve plug 14 and a fully drainable geometry when mounted in horizontal piping, is shown in FIGS. 5 through 6A. Yet another alternate embodiment, including a valve port 34 having a diameter matching the inside pipe diameter, thus enabling full flow, and a fully drainable geometry when mounted in horizontal piping, is shown in FIG. 7. A further alternate embodiment, including a valve port 34 having a diameter matching the inside pipe diameter, thus enabling full flow, and a fully drainable geometry when mounted in vertical piping, is shown in FIGS. 8, 8A. A still further embodiment, including a flanged seat plate 74 which incorporates the combined functions of both an upstream flange and a seat plate, is shown in FIGS. 10, 11, 11A, as mounted in piping systems of different orientation and flow direction. Yet a further, more generalized embodiment used to illustrate the wider applicability of the valve device 10 to non-sanitary as well as sanitary piping systems is shown in FIGS. 9, 9A.

Figure 1A:
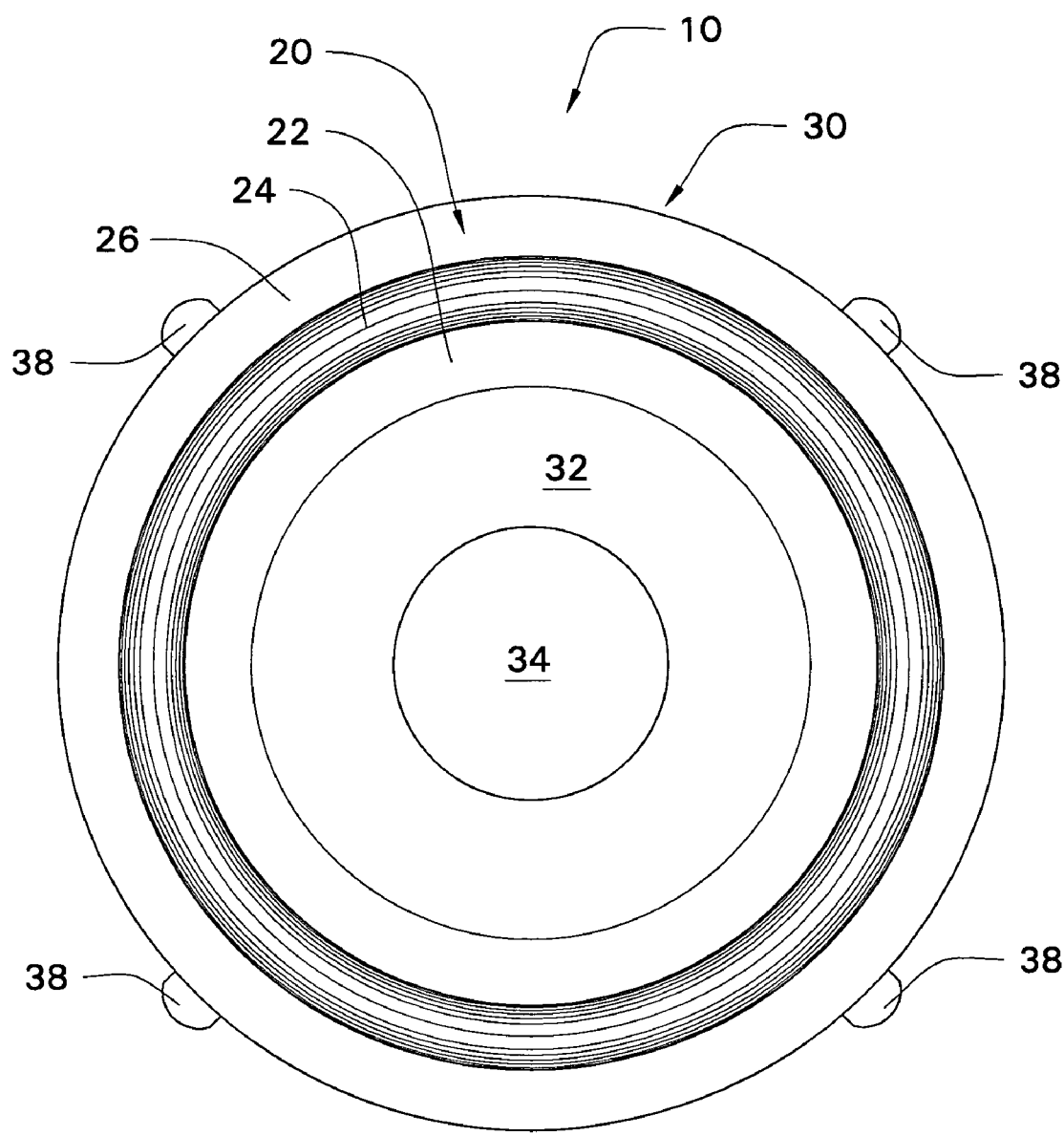
FIG. 1A is an end elevation view of the sanitary check valve of the present invention viewed from the upstream direction looking downstream.

The construction of the basic embodiment of the valve device 10 is best described with reference to FIGS. 1, 1A in combination with the cross-sectional views illustrated in FIGS. 2, 2A through section 2-2 of FIG. 1 and the cross-sectional views illustrated in FIGS. 2B, 2C through section 2B-2B of FIG. 1. FIG. 1 shows the valve device 10 when viewed from the downstream direction looking upstream, as the valve device 10 appears when not mounted in between flanges in a sanitary piping system. The valve device 10 comprises two major components, the molded elastomer valve body 30 and the valve seat plate 32. The valve device 10, in any of its embodiments, when mounted between two flanges, serves as both a flange gasket and a check valve.

The molded elastomer valve body 30 comprises multiple functional portions, including a gasket system 20, a plurality of flexible retaining arms 12, the valve plug 14, a valve plate mounting groove 28, and at least one orientation tab 38. The valve body 30 is molded to be of a fixed circular outer diameter as viewed from the end in FIGS. 1, 1A, and is essentially planar as viewed in the cross-sections of FIGS. 2, 2A, 2B, 2C, with the flexible arms 12 guiding and restrictively permitting the movement of the valve plug 14 out of and back into the original plane with respect to the rest of the valve body 30 when appropriate fluid force is applied. For purposes of the present invention, a fluid may defined as any material that is flowable in a pipe, including a gas, a liquid, a two-phase mixture of gas and liquid, a liquid-solid solution, a liquid-solid slurry, a solid suspended in a gaseous flow, a three-phase mixture, or any other flowable combination.

Figure 2A:
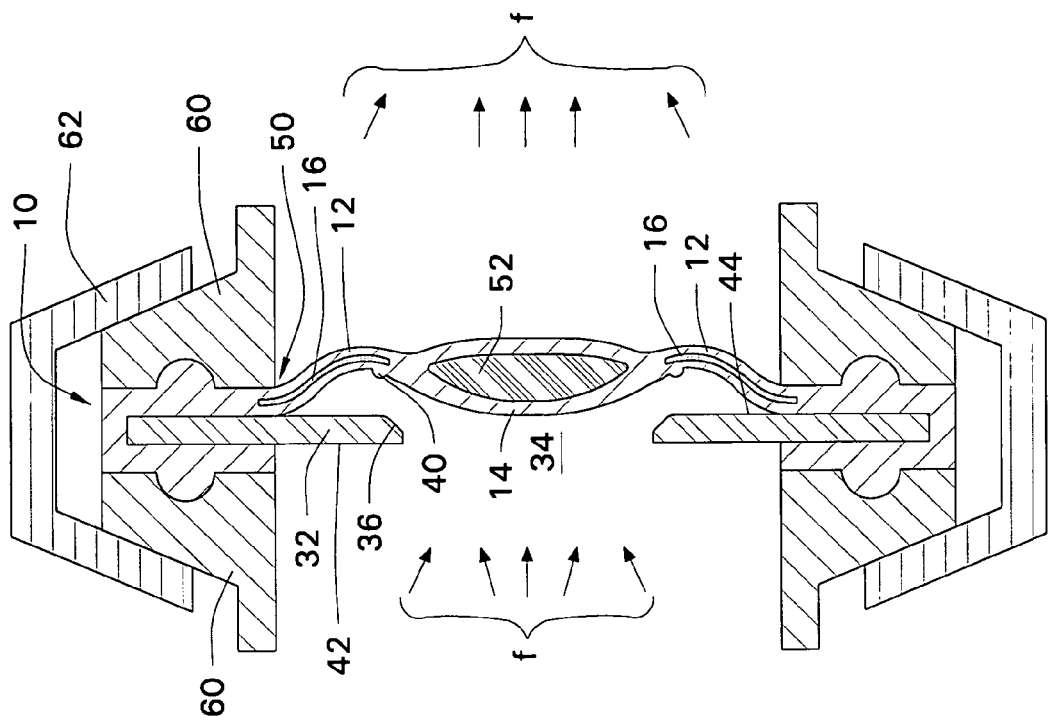
FIG. 2A is a cross sectional view of the sanitary check valve of the present invention in the open position installed in between sanitary pipe flanges, taken through the 2-2 section of FIG. 1, showing the flow of fluid in the forward direction.
Figure 2:
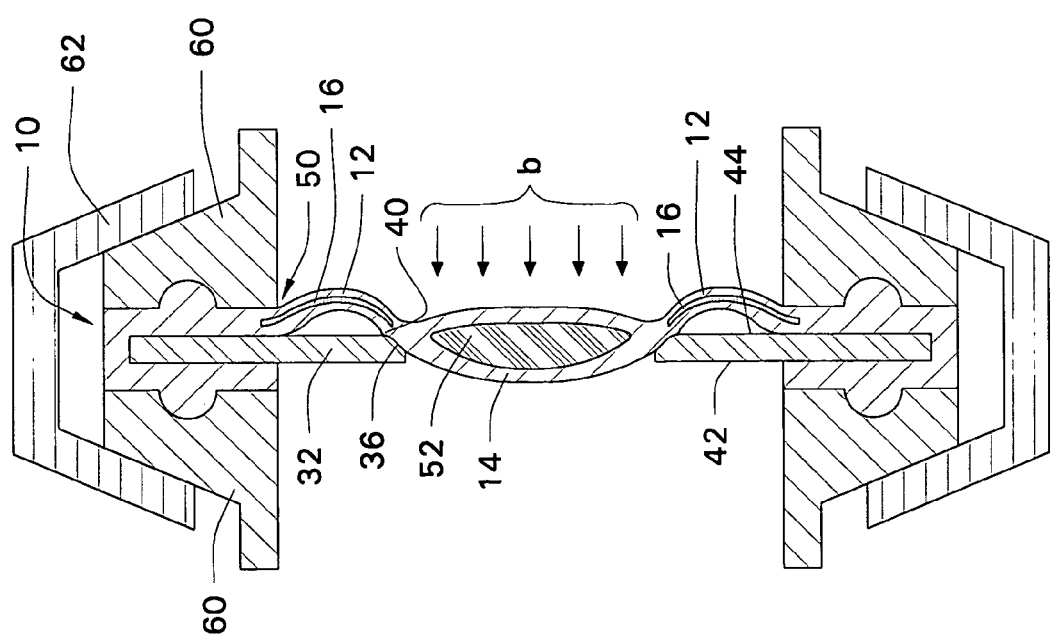
FIG. 2 is a cross sectional view of the sanitary check valve of the present invention in the closed position installed in between sanitary pipe flanges, taken through the 2-2 section of FIG. 1, showing the acting force of back pressure.
Figure 2C:
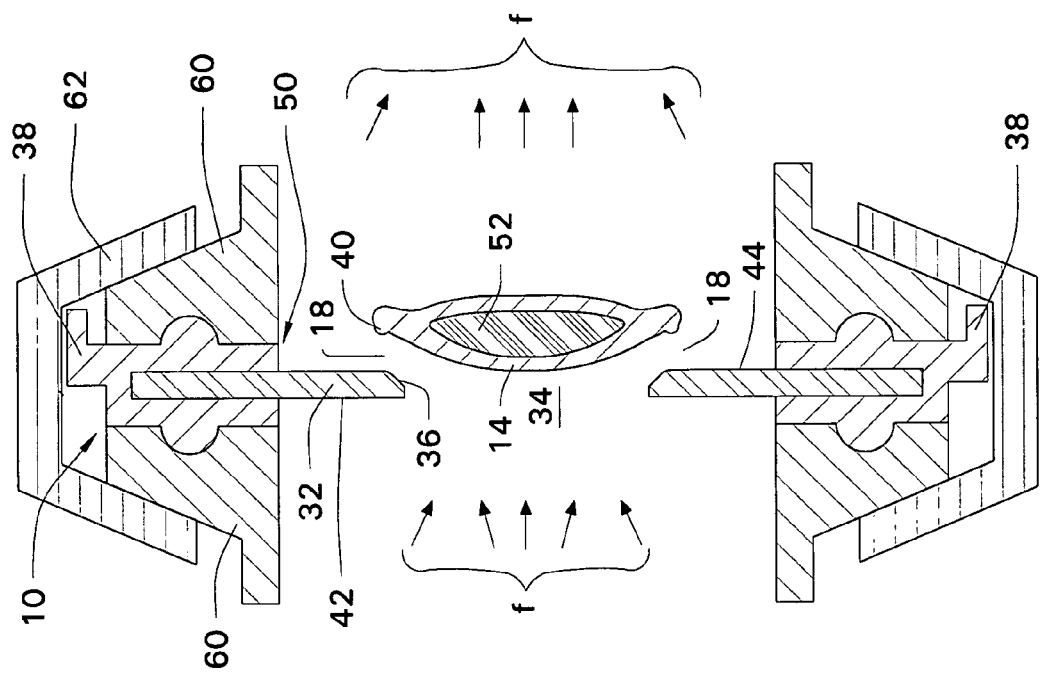
FIG. 2C is a cross sectional view of the sanitary check valve of the present invention in the open position installed in between sanitary pipe flanges, taken through the 2B-2B section of FIG. 1, showing the flow of fluid in the forward direction.
Figure 2B:
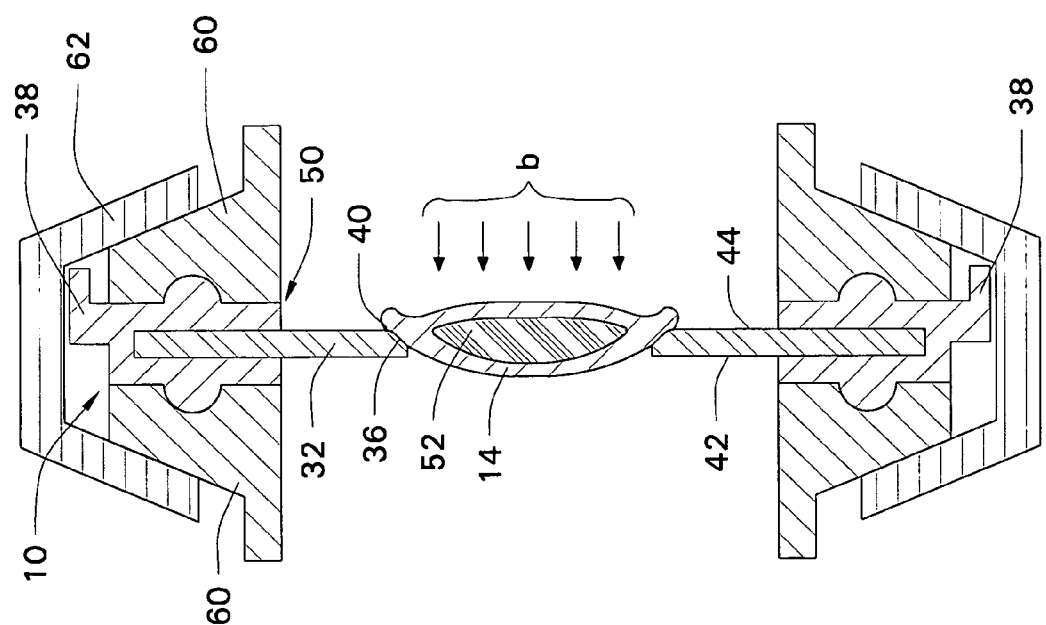
FIG. 2B is a cross sectional view of the sanitary check valve of the present invention in the closed position installed in between sanitary pipe flanges, taken through the 2B-2B section of FIG. 1, showing the acting force of back pressure.

In particular, FIGS. 2, 2A, taken together, show the positions of the valve plug 14 in and out of the original plane, respectively, when viewed through sectional cut 2-2 of FIG. 1. FIGS. 2B, 2C, taken together, show the positions of the valve plug 14 in and out of the original plane, respectively, when viewed through section cut 2B-2B of FIG. 1. Similarly, the molding of the alternate embodiments can be seen from the end in FIGS. 4, 5, 9, and from cross-sectional perspective in FIGS. 6, 6A, 7, 8, 8A, 9A, 10, 11, 11A.

The valve seat plate 32 is an essentially planar solid plate formed to be of a fixed circular outer diameter, further comprising the centrally and symmetrically positioned valve port 34. The outer diameter of the valve seat plate is essentially equal to, or slightly larger than, the inner diameter of the valve plate mounting groove 28 of the valve body 30, and the thickness of the valve seat plate 32 at and near its outer edge is essentially equal to, or slightly larger than, the width of the valve plate mounting groove 28 of the valve body 30. It is noted that the valve seat plate 32 need not be flat and in fact may possess some structural and flow advantages if it is formed as a curved or non-planar piece, facing either in the upstream or downstream direction, or in both directions together.

The valve seat plate 32, even when essentially planar in construction, includes a minimum taper of both the upstream face 42 and the downstream face 44 to ensure drainability of the valve device 10 when mounted in vertical piping. The industry standard pipe pitch for drainability is a slope of ⅛ inch per foot, or about 0.60 degrees (approximately 0.01 radians), and the minimum face taper is set to meet or exceed that industry standard. For example, in a valve device 10 mounted in a 2 inch diameter tube having an actual inside diameter of 1.87 inches with the valve device 10 including a valve port 34 having a diameter of no less than 0.935 inches, each face of the valve seat plate 32 would have a taper of about 0.005 inches, resulting in the valve seat plate being about 0.010 inches thicker at the sealing interface 50 than at the valve port 34, not including any decrease in thickness at the valve port 34 due to the beveled valve seat 36. Proportional tapers may be calculated similarly for a valve device 10 of any size.

The valve device 10 is assembled from its two major component parts by inserting the valve seat plate 32 into the valve plate mounting groove 28 of the molded valve body 30. The valve plate mounting groove 28 retains the valve seat plate 32 and forms a seal along both the upstream face 42 and the downstream face 44 of the portion of the valve seat plate 32 that is retained in the valve plate mounting groove 28 at the sealing interface 50. The seal between the surfaces of the valve plate mounting groove 28 and the surfaces of the valve seat plate 32 is improved when the valve device 10 is installed in a piping system and the gasket system 20 of the valve body 30 is compressed between pipe flanges 60, as shown in FIGS. 2, 2A, 2B, 2C for the basic embodiment of FIG. 1. When the valve device 10 is assembled, the valve plug 14 of the valve body 30 seals the valve port 34 of the valve seat plate 32, the valve plug 14 being held against the beveled valve seat 36 by the spring force applied by the retaining arms 12.

The valve body 30 may be molded from a variety of flexible and strong elastomer compounds which are used in the sanitary or non-sanitary fluid processing fields, including but not limited to EPDM, PTFE, silicone, Buna-N, and neoprene. For use in sanitary processing, it is critical that the material of construction of the valve body 30 be capable of handling repeated steam sterilizations at 250° F. and sealing at operating pressures up to 100 PSIG, while still retaining its properties of flexibility. For use in non-sanitary processing, the material of construction of the valve body 30 only needs to meet whatever temperature and pressure requirements are called out for that particular application in accordance with standard piping design procedures outlined in ANSI or ASME guidelines.

EPDM, silicone, and PTFE have been used for years as gaskets for tri-clamp fittings, and therefore there is no question of the application of these compounds to the gasket system 20 of the valve device 10. Additionally, EPDM and silicone have been used for years as the molded diaphragms in sanitary diaphragm valve designs and have been proven to hold to up to repeated cycling under sterilization temperature and pressure conditions while remaining flexible and capable of providing a sealing surface. While PTFE is not as flexible as EPDM and silicone, it has been proven over years of usage as a coating surface on EPDM molded diaphragms (termed EPDM-backed PTFE diaphragms), and it is envisioned that this combination would work equally well in the design of the present valve device 10. This combination utilizes be best features of each material: the flexibility and strength of EPDM and the superior sanitary surface properties of PTFE. Buna-N and neoprene are also capable of retaining their flexibility and elasticity under repeated steam sterilizations, but are not typically preferred for sanitary applications. However, these materials could be used for non-sanitary applications of the valve device 10. Other equivalent or similar elastomers, whether existing or yet to be developed, could also function as the material of construction for the valve body 30.

The valve seat plate 32 must be constructed of a material with sufficient rigidity to retain the shape of the valve port 34 and to support and withstand the closing force of the valve body 30 combined with the back pressure of a piping system, as well as the forward pressure of flow through the piping system. For sanitary piping systems, the supply pressure does not normally exceed 100 PSIG and thus the typically non-critical pressure drop across the valve in forward flow direction would be less than 50 PSIG. In the reverse directions, sanitary piping systems would not be expected to apply more than 50 PSIG back pressure, although there is no intrinsic limitation on the thickness of the valve seat plate 32 and therefore the valve seat plate 32 can readily be of sufficient thickness to withstand the full working pressure of the piping system in which it is mounted, acting in either or both directions.

For sanitary piping systems, the valve seat plate 32 would preferentially be constructed from 316SS or 316LSS (or in some cases 304SS or 304LSS), or from nylon, molded PTFE or molded reinforced PTFE. However, particularly for non-sanitary applications, the valve seat plate 32 may alternatively be constructed from any sufficiently rigid material such as metal or plastic, including carbon steel, aluminum, copper, brass, and thermoplastic resin. Therefore, the selection of the elastomer material for valve body 30 and the rigid material for valve seat plate 32 is dependent on the pressure, temperature, and sanitary requirements of the particular application, as well as the diameter of the piping into which the valve device 10 will be mounted.

The preferred gasket system 20, as shown, is based upon the sanitary flange "tri-clamp" gaskets which have been commonly used in the pharmaceutical and food industries for many years. This design is exemplified by the disclosure of U.S. Pat. No. 2,789,844 [Kessler, 1957]. A large number of improved or modified sanitary flange gasket designs have been developed since, including, for example, those disclosed in U.S. Pat. No. 5,947,533 [Fisher], U.S. Pat. No. 6,045,033 [Zimmerly], and U.S. Pat. No. 6,234,545 [Babuder]. In addition, many other non-sanitary flange gasket designs exist. Because the functional utility and novelty of the valve device 10 of the present invention is independent from the type of flange gasket that is used, the specific sanitary flange gasket system 20 is shown for illustrative purposes only, to enable the illustration of applications of the valve device 10 in a piping system, but is not intended in any limiting sense regarding the usage of the valve device 10. An example of an alternate configuration is shown in FIGS. 9, 9A, which illustrate the application of valve device 10 using standard flat faced flanges in a piping system.

The primary working portion of the valve device 10 is comprised of the valve plug 14 and a plurality of flexible retaining arms 12. For balanced operation of the valve device 10, with valve plug 14 moving in a downstream direction positioned concentrically within the piping, a minimum of three flexible retaining arms 12 is anticipated, with a design of four retaining arms 12 providing a small measure of added balance and sealing force. In order to achieve maximum flow area in the flow paths 18 interposed between the retaining arms 12, there are two alternatives. First, the number of retaining arms 12 can be kept to a minimum. Second, a larger number of much thinner retaining arms 12 may be used, although this option may present more difficulties with cleaning, orientation for drainability, and strength of each individual retaining arm 12. In addition to the four arm design illustrated in FIGS. 1, 5, 9 and the accompanying cross-sectional views of FIGS. 2, 2A, 2B, 2C, 6, 6A, 7, 8, 8A, 9A, an alternative three arm design of the valve device 10 is illustrated in FIG. 4. The alternative three arm design may have the advantage of a increased flow area defined by three larger flow paths 18, depending on the thickness of the flexible arms 12 required to support the movement of the valve plug 14.

Optionally embedded in each flexible retaining arm 12 is a spring means 16, to enhance the ability of the valve plug 14 to seal against the valve seat plate 32 and to provide an additional cracking pressure resistance to forward flow through the valve device 10. The open flow paths 18 created between the valve plug 14, the flexible arms 12, and the sealing gasket 22 provide a flow path for fluid around the valve plug 14 when the valve device 10 is in the open position. This is best illustrated in FIGS. 2A, 2C. Fluid pressure in the forward flow direction forces the valve plug 14 away from the valve seat plate 32, working against the retaining force applied by the flexible arms 12 in conjunction with the optional spring means 16. Thus, when the valve device 10 is forced open in this manner, the forward flow f occurs through the valve port 34 in the center of the valve seat plate 32, around the valve plug 14, and through the open flow paths 18, continuing on through the piping downstream of the valve device 10.

The optional spring means 16 is utilized to ensure closing of the valve 30 against the valve seat 32 and may not be required in all instances. Some elastomer materials, when molded in a position as shown in FIG. 3, with the valve plug 14 pushed past the closed position, have sufficient elasticity and spring strength to retain the valve plug 14 in its seated position against the valve seat plate 34 when the valve device 10 is assembled. However, some elastomer materials do not have sufficient strength to do so, and therefore the option for the spring means 16 is included in the design of the valve device 10. If utilized, one end of each spring means 16 is embedded in the gasket system 20, so that the one end is securely clamped between the sanitary tube flanges 60. The other end of each spring means may extend into the valve plug 14 and may be connected to the optional core 52.

The spring means 16 is embedded and fully encased in the elastomer material of the valve body 30 and is therefore not in contact with any process fluid. As such, the spring means 16 may be constructed from a wide variety of materials with sufficient elastic range and spring strength both to seal the valve plug 14 against the valve seat plate 32 and to open access to flow paths 18 by allowing the valve plug 14 to be pushed by the flowing fluid in a downstream direction away from valve seat plate 32. Possible materials of construction of the spring means 16 include a layer of fabric as well as a piece of plastic or metal. It is noted, for example, that many sanitary diaphragm valve diaphragms are formed from EPDM with an embedded layer of fabric to provide an extra measure of rigidity, strength, and ability to withstand repeated flexings. By altering the material and thickness used to fabricate the spring means 16, or even the existence of the spring means 16 altogether, the cracking pressure of the valve device 10 can be adjusted, as is often required for specific engineering applications.

FIG. 2 illustrates the valve device 10 mounted in between sanitary pipe flanges 60, with valve device 10 shown in the closed position as viewed in a cross-sectional cut taken through the flexible retaining arms 12 denoted as section 2-2 of FIG. 1 but with the valve device 10 installed as used. In the standard sanitary "tri-clamp" design, the clamp ring 62, typically including one or two hinges and bolt and nut arrangement to fasten the ends of clamp ring 62 to each other, is positioned over the beveled edges of the sanitary pipe flanges 60 and is tightened to create sealing pressure between the faces of the sanitary pipe flanges 60 and the outer faces of the valve body 30 of the valve device 10. A common clamp design having two hinges and a fastening bolt and nut is disclosed in U.S. Pat. No. 4,568,115 [Zimmerly], although single hinge clamps are equally as common, particularly for small tube sizes. In addition, when the clamping ring 62 is tightened about the sanitary tube flanges 60, the clamping force is further transmitted to create sealing pressure between the inner faces of the valve plate mounting groove 28 and the upstream face 42 and downstream face 44 of the valve seat plate 32 at the sealing interface 50. Note that the thickness of the gasket system 20 combined with the thickness of the valve seat plate 32 may be greater than the thickness of a standard tri-clamp gasket, and therefore the clamp ring 62 may need to be slightly wider than the standard sanitary clamp design.

In FIG. 2, it is shown that the flexible arms 12, with assistance from the optional spring means 16, force the valve plug 14 against the valve seat plate 32, effectively preventing reverse flow through the valve device 10. In fact, as shown in FIGS. 2, 2B, the back pressure b from any attempted reverse flow serves to seal the valve plug 14 even more tightly against the valve seat plate 32. In addition, the beveled valve seat surface 36 on the lip of the valve port 34 through the valve seat plate 32 provides a flat sealing surface to which the elastomeric valve plug 14 can nicely conform. Further, the annular sealing ridge 40, of slightly larger diameter than the beveled valve seat 36, is molded into the valve plug 14 and seats on the downstream surface of the valve seat plate 32, preventing the valve plug 14 from being pushed too far into or through the valve port 34.

In FIG. 2A, it is shown that the forward flow f in the piping works against the spring force of the flexible arms 12, in conjunction with the optional spring means 16, to force the valve plug 14 away from the valve seat plate 32, creating a flow path around the valve plug 14 and through the flow paths 18 which are interposed between the flexible arms 12. As long as the differential pressure created across the valve port 34 by forward flowing fluid is sufficient to exceed the cracking pressure of the valve device 10, defined as the pressure required to maintain the valve plug 14 in an unseated position, then forward flow will continue. If the differential pressure of forward flow across the valve port 34 falls below the threshold cracking pressure or if the flow attempts to reverse directions, the spring force of the flexible arms 12, in conjunction with the optional spring means 16, will close the valve device 10 as discussed previously in reference to FIG. 2.

Optionally embedded in the valve plug 14 is the core 52, which imparts additional stiffness to assist the valve plug 14 in resisting deformation under backpressure and in forming a consistent seal against valve seat plate 32 when the valve device 10 is in the closed position. Some of the elastomer materials from which the valve plug 14 may be comprised have sufficient rigidity without reinforcement by the core 52, particularly in valve devices 10 of small diameter. However, some elastomer materials do not inherently have sufficient rigidity to resist deformation, and therefore the option for the core 52 is included in the design of the valve plug 14. The core 52 is embedded and fully encased in the elastomer material of the valve plug 14 and is therefore not in contact with any process fluid. As such, the core 52 may be constructed from a wide variety of materials capable of imparting additional rigidity to the valve plug 14, including a layer of fabric as well as a piece of plastic or metal. By altering the material and thickness used to fabricate the core 52, or even the existence of the core 52 altogether, the ability of the valve plug 14 to consistently seal the valve device 10 in the closed position can be adjusted to suit a wide variety of engineering applications. The core 52 may be integrally connected to the spring means 16 which are embedded in the flexible arms 12, or it may be separately embedded within the valve plug 14 regardless of the presence or lack of the optional spring means 16.

In order to provide visual indication that the valve device 10 is oriented in the correct direction of flow when installed in a piping system, at least one orientation tab 38 is incorporated into the molded valve body 30. The orientation tabs 38 extend outwardly from the backup gasket 28 and further extend in the downstream direction corresponding to the direction of movement of the valve plug 14 when the valve device 10 is open. The orientation tabs 38 are a useful visual tool to enable a worker to install the valve device 10 in the desired direction, and even once the valve device 10 is installed between two sanitary tube flanges 60, a quick visual inspection can ensure that the valve device 10 will enable flow in the desired direction. Additionally, the orientation tabs 38 are positioned at points around the perimeter of the valve body 30 adjacent to the flow paths 18 so that installing the valve device 10 with an orientation tab 38 extending outwardly in a vertical direction, either upward (for a valve device 10 with an even number of flexible arms 12) or downward (for a valve device 10 with any number of flexible arms 12), will minimize the possibility of debris accumulating in between one of the flexible arms 12 and the valve seat plate 32.

As previously noted, one of the most important properties of a valve designed for use in a sanitary piping system is that the valve be drainable, such that the valve does not include any physical features which would retain permanent puddles of water or liquid. While it is sometimes inevitable that a puddle of liquid may be formed when a valve is in the closed position, due to the orientation and flow direction of the piping into which the valve is mounted, it is critical that this puddle disappear when the valve is opened during the sterilization operation. Otherwise, this puddle may not attain a sufficient time-temperature profile during sterilization to kill any potential contaminating organisms, and the system will not be sterile. As a result, many prior art devices require mounting of the device only in specific orientations. At least one of the embodiments of the valve device 10 of the present invention is able to meet the criteria of drainability for each possible mounting orientation, and one particular embodiment, that of FIG. 5, is drainable in every possible mounting orientation.

The two embodiments shown in FIGS. 5, 7 are specifically designed for mounting in horizontally flowing piping, noting again that in sanitary piping, an industry standard pipe pitch of ⅛" per foot, or about 0.6 degrees, is employed to ensure gravity draining. It is of no consequence to the operation of the designs in FIGS. 5, 7 whether the pipe is pitched in the upstream or the downstream direction.

The embodiment of FIG. 5 comprises an elliptical valve port 34 and an elliptical valve plug 14 instead of the circular design employed in the basic embodiment of FIG. 1. For proper draining, the valve device 10 is mounted with the orientation tabs 38 in the vertical plane, facing straight up and straight down, so that the major axis of the elliptical valve port 34 is also in the vertical plane. When the valve plug 14 is closed against the valve seat plate 32, a puddle may form upstream of the valve device 10 if the pipe is pitched in a downstream direction, or a puddle may form downstream of the valve device 10 if the pipe is pitched in an upstream direction. However, as illustrated in FIGS. 6, 6A, once the valve plug 14 is forced away from the valve seat plate 32 by the fluid flow f, the sealing interface 50 of the valve device 10 forms a continuous flat surface with the upstream and downstream sanitary pipe fittings 60 so that there is no physical place to retain a puddle. Thus, the embodiment of FIG. 5 is fully drainable when mounted in horizontal piping and is still retains all of the size and retrofitting advantages of the basic embodiment of FIG. 1. Further, although it is specifically designed for mounting in horizontal piping, the embodiment of FIG. 5 works equally well when mounted in vertical piping, or piping of any pitch, because the faces 42, 44 of the valve seat plate 32 are tapered just as in the embodiment of FIG. 1.

The operation of the embodiment of FIG. 5 of the valve device 10 in both the open and closed positions is essentially the same as that of the embodiment of FIG. 1, with the exception of the very small area at the tip 54 of the oval valve plug 14 in the embodiment of FIG. 5. When the valve device 10 is in the open position, the fluid flowing around the valve plug 14 flexes the tip 54 enough to move it away from the pipe wall, as shown in FIG. 6. When the valve device 10 is in the closed position, a very small portion of the annular sealing ridge 40 rests on the tube wall approximately at the sealing interface 50 (the junction between the elastomer of the sealing gasket 22 and the sanitary tube flange 60), forming a seal, as shown in FIG. 6. This seal is enhanced by the fluid back pressure b acting on the valve body 30, which forces the tip 54 of the valve plug 14 more snuggly against the valve seat plate 32 and tube wall of the tube flange 60.

The embodiment of FIG. 7 is fully drainable when mounted in horizontal piping and further includes at least one advantage and at least one disadvantage not seen in previously discussed embodiments. The primary disadvantage is that this embodiment is drainable only when pitched in the downstream direction. The primary advantage of the embodiment of the valve device 10 illustrated in FIG. 7 is that it provides a valve port 34 of the same diameter as the prevailing inside pipe diameter into which it is mounted. In place of the valve seat plate 32 of the embodiment of FIG. 1, which acts similarly to an orifice plate when the valve device 10 is in the open position, the embodiment of FIG. 7 utilizes an upstream sanitary seat flange 64. The sanitary seat flange 64 has a tube diameter equal to that of the upstream piping and is an integral part of the valve device 10. The sanitary seat flange 64 may be attached to the upstream tubing by orbital welding or by a standard sanitary fitting, as desired. Incorporated into the sanitary seat flange 64 is the beveled flange valve seat 56, so that the sanitary seat flange 64 serves the dual purpose of being a sanitary tube flange and a valve seat plate. Additionally, the downstream face 48 of the sanitary seat flange 64 is tapered in the same manner as the downstream face 44 of the valve seat plate 32 is tapered for the embodiment of FIG. 1, a feature which is not particularly significant for this embodiment but is critical for the mounting configuration of the embodiment of FIG. 8A, as will be discussed.

In the embodiment of FIG. 7, the valve body 30 no longer needs to retain the valve seat plate 32 and therefore the gasket system 20 is simpler and much closer to a standard "tri-clamp" gasket in design. The remainder of the valve body 30 is identical to the previously discussed basic embodiment of FIG. 1 in every other respect. The downstream eccentric sanitary reducer fitting 66 is required to ensure drainability of the valve device 10 of this embodiment. The eccentric sanitary fitting 66 may be a standard sanitary component that reduces the tube diameter from twice the nominal diameter back to the nominal diameter of the prevailing system in which it is mounted, or it may be a custom sanitary piece for performing the same function supplied with the valve body 30 and the sanitary seat flange 64. Further, due to the simplified design and reduced thickness of the gasket system 20 of the valve body 30, a standard sanitary flange clamp rig 62 may be used.

In the embodiments illustrated in FIGS. 5, 7, the orientation tabs 38 served an enhanced function. When the valve device 10 or the valve body 30 is installed in properly pitched horizontal piping with an orientation tab 38 extending outwardly in a vertical direction, the flexible arms 12 are rotated away from the bottom of the valve device 10, and therefore the valve device 10 is fully drainable since there will be no obstruction to the flow of liquid at the bottom of the valve device 10. Thus, the orientation tabs 38 provide visual indication that the valve device 10 is mounted correctly to ensure both drainability and the desired flow direction.

The embodiment shown in FIGS. 8, 8A is specifically designed for mounting in vertically flowing piping, with FIG. 8 showing a configuration for downward flow and FIG. 8A showing a configuration for upward flow. The combination of the molded valve body 30 and the sanitary seat flange 64, including the tapered downstream face 48, is identical to the component set used in the embodiment of FIG. 7. However, the concentric sanitary reducer fitting 68 may be used in place of the eccentric sanitary reducer fitting 66 which was used in the horizontal implementation. It is readily seen that the embodiments of FIG. 8, 8A are fully drainable when the valve device 10 is open.

In some applications, it may be desirable to combine the physical flow geometry of the basic embodiment of FIG. 1 with the combination flange and seat plate design concept as seen in FIGS. 7, 8, 8A. The embodiment of this hybrid valve device 10 is illustrated in FIG. 10 as mounted in the horizontal flow direction, and in FIGS. 11, 11A as mounted in the vertical flow directions, with fluid flowing downward and upward, respectively. The flanged seat plate 74 of FIGS. 10, 11, 11A combines the functionality of both the upstream flange and the seat plate, in a similar manner to the sanitary seat flange 64 illustrated in the embodiments of FIGS. 7, 8, 8A. The primary difference between the embodiments of FIGS. 10, 11, 11A and the embodiments of FIGS. 7, 8, 8A is that the flanged seat plate 74 has a valve port 34 which is smaller than the prevailing inside pipe diameter into which the valve device 10 is mounted, whereas the sanitary seat flange 64 has a valve port 34 which is of the same inside diameter as the pipe into which the valve device 10 is mounted. The flanged seat plate 74 includes the beveled flange valve seat 56 and a tapered downstream face 78, as well as a tapered upstream face 76. The flanged valve seat plate 74 has a tube diameter equal to that of the upstream piping into which it is installed and is an integral part of the valve device 10. The flanged valve seat plate 74 may be attached to the upstream tubing by orbital welding or by a standard sanitary fitting, as desired. In this embodiment, the flanged valve seat plate 74 and valve body 30 are coupled to the standard sanitary flange 60 by a standard sanitary clamp 62.

Illustrated in FIGS. 9, 9A is an embodiment of the valve device 10 mounted between a generic pair of flat faced flanges 70. Instead of using a clamp ring 62, as in the sanitary designs, the flanges 70 are pulled together by bolts inserted into the bolt holes 72 in order to retain the valve device 10 and compress the gasket system 20. In all other respects, this embodiment operates in the same manner as the previously discussed versions.

In summary, the valve device 10 of the present invention operates as both a flange gasket and a check valve, and in most embodiments is easily installed or retrofitted between existing flanges in a piping system. The valve device 10 comprises a molded elastomer valve body 30 and a rigid valve seat plate 32 retained within the valve body 30. The gasket system 20 of the valve body 30 provides a seal between the mounting pipe flanges 60 while the valve plug 14, guided by a plurality of retaining arms 12, moves open under the force of forward flow and moves closed under the spring force of the retaining arms 12 and any existing back pressure in the piping. Orientation tabs 38 provide a visual indication that the valve device 10 is installed, facing in the desired direction of flow, and freely drainable. The basic embodiment of FIG. 1, the alternate embodiment of FIG. 4, the alternate embodiments with integrated upstream flange and valve seat of FIGS. 11, 11A, and the full flow embodiments of FIGS. 8, 8A, are fully drainable when mounted in vertical piping. The full flow embodiment of FIG. 7 is fully drainable when mounted in horizontal piping, and the alternate embodiment of FIG. 5 is fully drainable when mounted in piping of any pitch including vertical and horizontal. In this context, horizontal piping is taken to mean that the piping is at least pitched to the sanitary piping standard of ⅛ inch per foot. The alternate embodiment of FIG. 4 illustrates that designs utilizing less than, or more than, four flexible arms 12 have been contemplated. Finally, the alternate embodiment of FIG. 9 illustrates the general applicability of the valve device 10 to any flanged piping system.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A check valve device for mounting in process piping systems which allows fluid flow in an upstream-to-downstream direction and prevents fluid flow in the opposite downstream-to-upstream direction, the valve device comprising:
    a rigid plate including an outer circumferential edge, an upstream face, a downstream face, and a port through said plate extended between said faces; and
    a body including a gasket, a plug, and a retaining means flexibly interconnecting between said gasket and said plug, said gasket being adapted to seal between a pair of mating pipe flanges consisting of an upstream flange and a downstream flange, said plug being adapted to seal said port when retained against said downstream face of said rigid plate, said retaining means guiding the movement of said plug outwardly from and inwardly towards said downstream face of said rigid plate, said retaining means further being adapted to retain said plug against said downstream face of said rigid plate to seal said port, said retaining means creating a plurality of flow paths through which fluid passes around said plug when said plug is pushed away from said downstream face by fluid flowing in the upstream-to-downstream direction;
    wherein an edge of at least one said flow path is coincident with and immediately adjacent to the inside wall of the piping system;
    wherein said port is of ovalized shape having a minor axis smaller than, and a major axis equal to, the inside diameter of the pipe into which said valve device is installed; and
    wherein said check valve device is drainable when mounted so that the lowest point of said port is located where a vertex of said major axis coincides with the inside wall of the piping system and the fluid flow direction through said check valve device is substantially horizontal, substantially vertical, whether substantially upward or substantially downward, or at any angle between substantially horizontal and substantially vertical including partially upward or partially downward.

2. The check valve device of claim 1, wherein each said flexible arm includes an embedded spring means.

3. The check valve device of claim 1, wherein said plug includes an embedded core.

4. The check valve device of claim 1, wherein said downstream face of said rigid plate is beveled around the perimeter of said port to create a valve seat, and said plug is adapted to mate with said valve seat.

5. The check valve device of claim 1, wherein said rigid plate is substantially planar; and wherein said downstream face of said rigid plate is tapered from said edge to said port and said upstream face of said rigid plate is tapered from said edge to said port, so that said rigid plate is thinner at said port and thicker at said outer edge.

6. The check valve device of claim 1,
    said retaining means comprising an even quantity of said flexible arms symmetrically positioned about the major axis of said plug to form at least one said flow path interposed between two adjacent flexible arms and aligned with the major axis of said plug, and further having at least one orientation tab extending outwardly between the mating pipe flanges and further extending in the downstream direction, wherein each said orientation tab is connected to said gasket adjacent to said at least one flow path aligned with the major axis of said plug to provide visual indication that said check valve device is mounted with the lowest point of said port disposed so that said check valve device is drainable in any fluid flow direction.

7. The check valve device of claim 6, wherein the quantity of said flexible arms is four.

8. The check valve device of claim 1, wherein said gasket includes a groove for receiving said outer circumferential edge of said rigid plate, whereby said gasket groove contacts a portion of said upstream face and a portion of said downstream face when said outer edge of said rigid plate is received into said groove.

9. The check valve device of claim 8, wherein said upstream flange and said downstream flange are sanitary pipe flanges.

10. The check valve device of claim 8, wherein said upstream flange and said downstream flange are flat faced flanges.

11. The check valve device of claim 1, wherein said rigid plate is integral to said upstream flange.

12. A check valve device for mounting in process piping systems which allows fluid flow in an upstream-to-downstream direction and prevents fluid flow in the opposite downstream-to-upstream direction, the valve device comprising:
    a rigid plate including an outer circumferential edge, an upstream face, a downstream face, and a port through said plate extending between said faces, the rigid plate being substantially planar, the downstream face being tapered from said edge to said port and said upstream face being tapered from said edge to said port, so that said rigid plate is thinner at said port and thicker at said outer edge, the downstream face of said rigid plate being beveled around the perimeter of said port to create a valve seat;
    a plug adapted to mate with said valve seat to seal said port when retained against said downstream face of said rigid plate; and
    a retaining means flexibly interconnecting between a gasket and said plug for guiding the movement of said plug outwardly from and inwardly towards said downstream face of said rigid plate, said retaining means further being adapted to retain said plug against said downstream face of said rigid plate to seal said port;
    wherein said port is of ovalized shape having a minor axis smaller than, and a major axis equal to, the inside diameter of the pipe into which said valve device is installed;
    wherein said check valve device is drainable when mounted so that the fluid flow direction therethrough is substantially horizontal, substantially vertical, or at any angle between substantially horizontal and substantially vertical including partially upward or partially downward;
    wherein said retaining means comprises an even quantity of flexible arms symmetrically positioned about the major axis of said plug creating an equal number of flow paths interposed between said arms through which fluid passes around said plug when said plug is pushed away from said downstream face by fluid flowing in the upstreat-to-downstream direction, at least one said flow path being aligned with the major axis of said plug, said at least one flow path having an edge coincident with and immediately adjacent to the inside wall of the piping system; and wherein said gasket includes a groove for receiving said outer circumferential edge of said rigid plate, whereby said gasket groove contacts a portion of said upstream face and a portion of said downstream face when said outer edge of said rigid plate is received into said groove; said gasket being adapted to seal between a pair of mating pipe flanges, said gasket comprising at least one orientation tab extending outwardly between the mating pipe flanges and further extending in the downstream direction, each said orientation tab being disposed adjacent to said at least one flow path aligned with the major axis of said plug, to provide visual indication that said check valve device is mounted to be drainable in any fluid flow direction.

13. The check valve device of claim 12, wherein said mating pipe flanges are sanitary pipe flanges.

14. The check valve device of claim 12, wherein said mating pipe flanges are flat faced flanges.

15. A check valve device for mounting between a pair of sanitary pipe flanges in process piping systems which allows fluid flow in an upstream-to-downstream direction and prevents fluid flow in the opposite downstream-to-upstream direction, the valve device comprising:

a rigid plate including an outer circumferential edge, an upstream face, a downstream face, and a port through said plate extending between said faces, the rigid plate being substantially planar, the downstream face being tapered from said edge to said port and said upstream face being tapered from said edge to said port, so that said rigid plate is thinner at said port and thicker at said outer edge, the downstream face of said rigid plate being beveled around the perimeter of said port to create a valve seat;

a plug adapted to mate with said valve seat to seal said port when retained against said downstream face of said rigid plate; and a retaining means flexibly interconnecting between a gasket and said plug for guiding the movement of said plug outwardly from and inwardly towards said downstream face of said rigid plate, said retaining means further being adapted to retain said plug against said downstream face of said rigid plate to seal said port;

wherein said port is of ovalized shape having a minor axis smaller than, and a major axis equal to, the inside diameter of the pipe into which said valve device is installed;

wherein said check valve device is drainable when mounted so that the lowest point of said port is located where a vertex of said major axis coincides with the inside wall of the piping system and the fluid flow direction through said check valve device is substantially horizontal, substantially vertical, or at any angle between substantially horizontal and substantially vertical including partially upward or partially downward;

wherein said retaining means comprises an even quantity of flexible arms symmetrically positioned about the major axis of said plug creating an equal number of flow paths interposed between said arms through which fluid passes around said plug when said plug is pushed away from said downstream face by fluid flowing in the upstream-to-downstream direction, at least one said flow path being aligned with the major axis of said plug, said at least one flow path having an edge coincident with and immediately adjacent to the inside wall of the piping system; and wherein said gasket is adapted to seal between a pair of sanitary pipe flanges, said gasket comprising at least one orientation tab extending outwardly between the pipe flanges and further extending in the downstream direction, each said orientation tab being disposed adjacent to said at least one flow path aligned with the major axis of said plug, to provide visual indication that said check valve device is mounted with the lowest point of said port disposed so that said check valve device is drainable in any fluid flow direction.

16. The check valve device of claim 15, wherein said gasket includes a groove for receiving said outer circumferential edge of said rigid plate, whereby said gasket groove contacts a portion of said upstream face and a portion of said downstream face when said outer edge of said rigid plate is received into said groove.

17. The check valve device of claim 15, wherein said rigid plate is comprised on said upstream flange.

* * * * *